United States Patent [19]

Keck

[11] 4,258,599
[45] Mar. 31, 1981

[54] METHOD AND APPARATUS FOR TRANSPORTING CUT BRICK ELEMENTS TO A TRANSFER STATION

[75] Inventor: Dieter Keck, Ibbenbueren, Fed. Rep. of Germany

[73] Assignee: C. Keller G.m.b.H. u. Co. KG, Ibbenbueren-Laggenbeck, Fed. Rep. of Germany

[21] Appl. No.: 47,264

[22] Filed: Jun. 8, 1979

[30] Foreign Application Priority Data

Sep. 14, 1978 [DE] Fed. Rep. of Germany ....... 2839984

[51] Int. Cl.³ .............................................. B26D 7/06
[52] U.S. Cl. ................... 183/112; 83/155.1; 81/307.2; 83/318; 264/157; 425/315; 425/316
[58] Field of Search ................ 83/295, 307.2, 307.3, 83/318, 319, 320; 425/315, 316; 264/157

[56] References Cited

U.S. PATENT DOCUMENTS

| 3,776,075 | 12/1973 | Matthews | 83/318 |
|---|---|---|---|
| 4,175,455 | 11/1979 | Genis | 83/318 |

FOREIGN PATENT DOCUMENTS

| 2656956 | 6/1978 | Fed. Rep. of Germany. | |
| 139964 | 1/1961 | U.S.S.R. | 425/316 |
| 566756 | 12/1945 | United Kingdom | 425/315 |
| 174414 | 1/1922 | United Kingdom | 425/315 |

Primary Examiner—James H. Derrington
Attorney, Agent, or Firm—Jordan and Hamburg

[57] ABSTRACT

In transporting brick elements cut from a continuous ribbon of brick-forming material to a transfer station for transfer onto pallets or the like, the ribbon is advanced towards the transfer station as the brick elements are cut from the leading end portion of the advancing ribbon. The cut brick elements are cut on an advancing cutting carriage and transferred therefrom onto a first conveyor means and from there to a second conveyor means, the first and second conveyor means advancing at a faster speed than the advancement of the ribbon. During the return of the cutting carriage, the first conveyor means moves at the same speed as the advancing ribbon while the second conveyor means remains stationary to facilitate transfer of the cut brick elements onto pallets or the like.

12 Claims, 4 Drawing Figures

METHOD AND APPARATUS FOR TRANSPORTING CUT BRICK ELEMENTS TO A TRANSFER STATION

BACKGROUND OF THE INVENTION

This invention relates to apparatus and process for transporting brick elements cut from a continuous ribbon of brick-forming material to a transfer position for transfer onto pallets or the like.

Republic of Germany DE-OS 25 56 956 describes a process where split-bricks, cut off from a clay or refractory band or ribbon are fed onto a conveyor track of a distribution device. The distribution device, consisting of a conveyor belt, is driven at a higher speed and distributes the split bricks to two conveyor belts driven in connecting relationship with the distribution device. The distribution device may be moved across the feed direction of the split-bricks and may be moved by a crank drive back and forth in such a manner that one split-brick each may be fed alternatingly to the conveyor belts. The split-bricks move upon the conveyor belts to assembly tongue elements which are pulled away from the split-bricks, thereby depositing them upon pallets.

With this known arrangement there is a disadvantage in that the conveyor belt and the distributing device run at different speeds so that friction arises on the bottoms of the split-bricks when being transferred from the conveyor belt to the distributing device, and this leads to deformation of sensitive and delicate material.

Due to the fact that the distributing device is only capable of moving one split-brick unto the conveyor belts when the distributing device swivels, a definite amount of time is needed for that, thereby causing a delay in the transport sequence of the split-bricks.

Furthermore, there is another disadvantage in that the arrangement of the conveyor belt, the distributing device, and the transportation belts results in large building costs and also a need for a large amount of space.

Another disadvantage is that the split-bricks tend to overturn due to the uneven motion of the distributing mechanism. This occurs particularly when working with thin split-bricks.

Accordingly, it is an object of the present invention to overcome the aforementioned disadvantages of known prior art devices and to provide a method and apparatus for the transport of split-bricks to a transfer station which allows even at high output, trouble-free and fast transport of the split-bricks without any frictional effects and which also require only low capital investment while needing but little space.

The method and apparatus of the present invention provides for a particularly high output because the needed transport cycle occurs in tandem and because the split-bricks are not subjected to a back and forth movement which limits the output.

Furthermore, the split-bricks are transported from one conveyor belt to another conveyor belt always at identical speeds so that this transfer occurs without the influence of friction.

Due to the compact design of construction, the need for space is minimized, and the apparatus may be used wherever space is at a premium.

Furthermore, the compact mode of construction allows great savings due to the avoidance of a need for long conveyors and a distributing device, an advantage to be found in reduced costs of investment.

Other features which are considered characteristic of the invention are set forth in the appended claims.

Although the invention is illustrated and described in relationship to specific embodiments, it is nevertheless not intended to be limited to the details shown, since various modifications and structural changes may be made therein without departing from the spirit of the invention and within the scope and range of equivalents of the claims.

The constructions and operations of the invention, however, together with additional objects and advantages thereof will be best understood from the following description of the specific embodiments when read in connection with the accompanying drawings.

SUMMARY OF THE INVENTION

This invention relates to an apparatus and process for transporting brick elements cut from a continuous ribbon of brick-forming material to a transfer position for transfer onto pallets or the like. A cutting carriage receives a continuous advancing ribbon and means are provided for reciprocating the cutting carriage in advance and return directions with the cutting carriage moving in the advance direction at the same speed as the advancing ribbon. Cutting means are provided for cutting the brick elements from the leading end portion of the advancing ribbon on the advancing cutting carriage. A first conveyor means receives the cut brick elements from the cutting carriage and a second conveyor means receives the brick element from the first conveyor means. Means are provided to operably connect the cutting carriage and the first conveyor means such that the support run of the first conveyor means is alternately shortened and lengthened with the respective advancement and return of the cutting carriage. Drive means are provided for driving first and second conveyor means at the same speed during the time that the cutting carriage advances, and to drive the first conveyor means at the same speed as the speed of advancement of the ribbon during the time that the cutting carriage moves in its return direction, the second conveyor means being stationary while the cutting carriage moves in its return direction to thereby facilitate removal of cut bricks from the second conveyor means to the pallets.

BRIEF DESCRIPTION OF THE DRAWINGS

FIG. 1a is a partial top plan view of the cutting apparatus.

DESCRIPTION OF THE PREFERRED EMBODIMENTS

Figure 1:
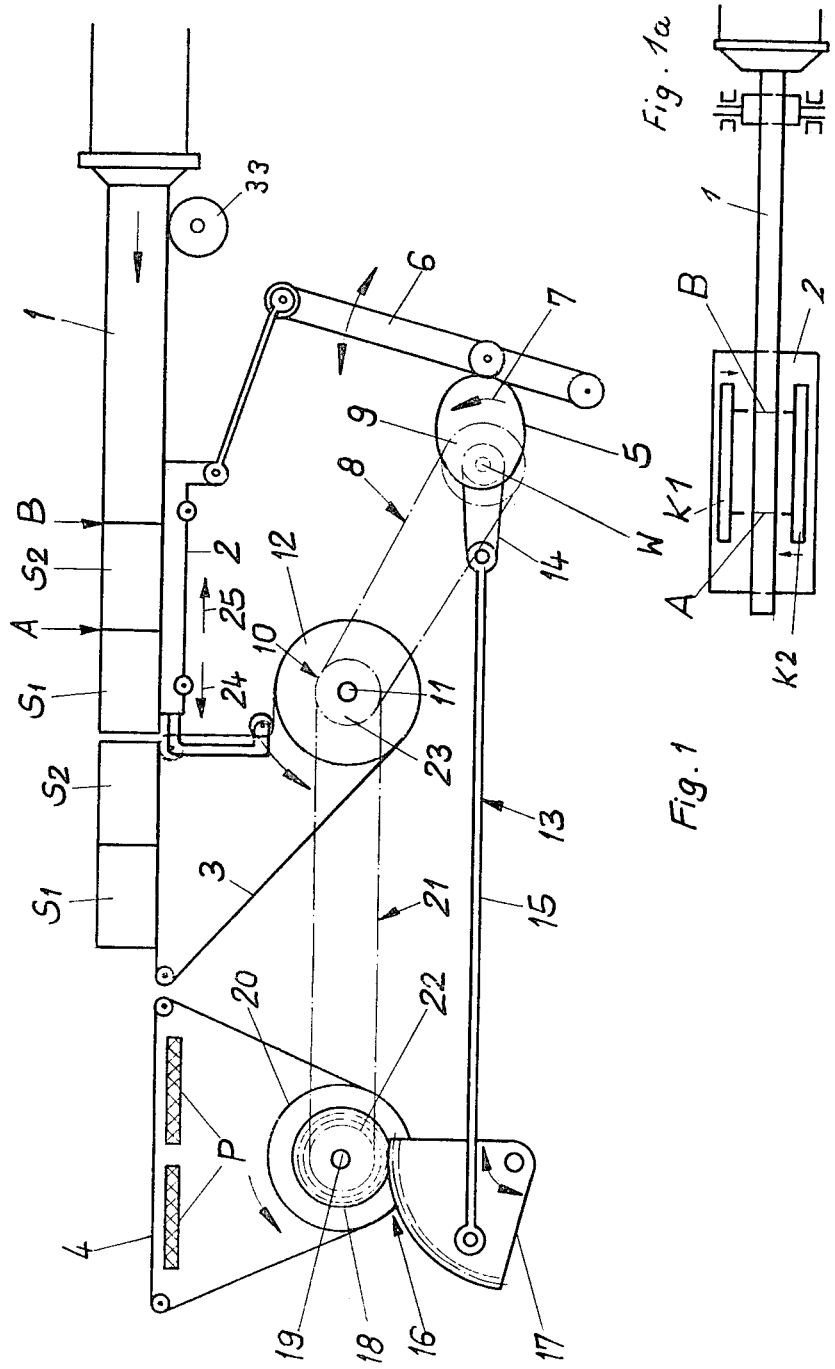
FIG. 1 is a side elevational view showing one embodiment of an apparatus and process of the present invention.

Referring to the drawings, a continuous band or ribbon 1 of clay or other brick forming material is fed to a cutting carriage 2. At the cutting carriage 2, the ribbon 1 and in unison therewith split-brick sections S1 and S2 are transported over a first conveyor belt 3 to a second conveyor belt 4 into a transfer area for further transfer of pallets P.

FIG. 1 shows the operation and how the device functions, wherein two split-brick sections are disposed upon the conveyor belt 3. FIG. 1a shows the cutting apparatus including the cutting tools K1, K2 which have protruding knives and which are movable toward one another as indicated by the arrows in FIG. 1a to thereby cut the ribbon 1 at A and B. The cutting tools K1, K2 are arranged on the cutting carriage 2 and move back and forth with the cutting carriage 2 as will be further set forth.

The cutting carriage 2 is moved synchronously with the speed of the ribbon 1 by a shaft W which drives a cam plate 5 and a lever bar 6 which is actuated by the cam plate 5.

When the cam plate 5 moves, from the position in FIG. 1, in the direction of the arrow 7, the cutting carriage 2 moves forwards (to the left in FIG. 1) in which case the ribbon 1 and the cutting carriage 2 move in synchronism. The shaft W is driven by an electric motor 32 through a gear transmission 31. A sensing or measuring roll 33 is arranged under and driven by the moving ribbon 1. Thus, the roll 33 picks up the speed of movement of the ribbon 1 and provides an input to an electronic control device 34 which controls the speed of the motor 32 and thus provides the necessary synchronism of movement of the cutting carriage 2 and the other parts as will be described.

A chain drive 8 consisting of a chain wheel 9 fastened to the shaft W and a chain wheel 10 disposed on a shaft 11 drives the conveyor belt 3 by means of the shaft 11 and a thereon fastened conveyor drive wheel 12. The conveyor 3 is driven at the speed of the ribbon 1. The chain wheel 10 is mounted on the shaft 11 by means of a coasting device acting opposed to the direction of rotation of the wheel 12 so that the coasting device will not preclude the shaft 11 and wheel 12 from rotating faster than the speed of rotation of chain wheel 10. Thus the coasting device 10 may function like the rear wheel drive of a bicycle as will be further described.

A crank gear drive 13 consisting of a crank 14 fastened to the shaft W and a pivotally connected crank rod 15 acts in conjunction with a transmission sector gear 16 consisting of a tooth segment 17 and a gear wheel 18 which is mounted on a shaft 19. A conveyor drive wheel 20 is connected to the shaft 19. Wheel 20 drives the conveyor belt 4 at a speed higher than the speed of the ribbon 1 due to the gear ratios present between the shafts W and 19. The gear wheel 18 is mounted on the shaft 19 by means of a coasting device, which acts opposing the direction of rotation of the conveyor drive wheel 20 so that the shaft 19 and conveyor belt 4 stand still when the gear segment 17 is moved from the position shown in FIG. 2 to the position shown in FIG. 1.

A chain drive 21 consists of a chain wheel 22 which is fastened to the shaft 19 and a chain wheel 23 disposed upon the shaft 11. The chain drive 21 drives the conveyor belt 3 at the same speed as the speed of the conveyor belt 4. The chain wheel 23 is also mounted on the shaft 11 by means of a coasting device, so that the shaft 19 and wheel 20 can remain stationary when the gear segment 17 is pivoted from its FIG. 2 to its FIG. 1 position.

Figure 2:
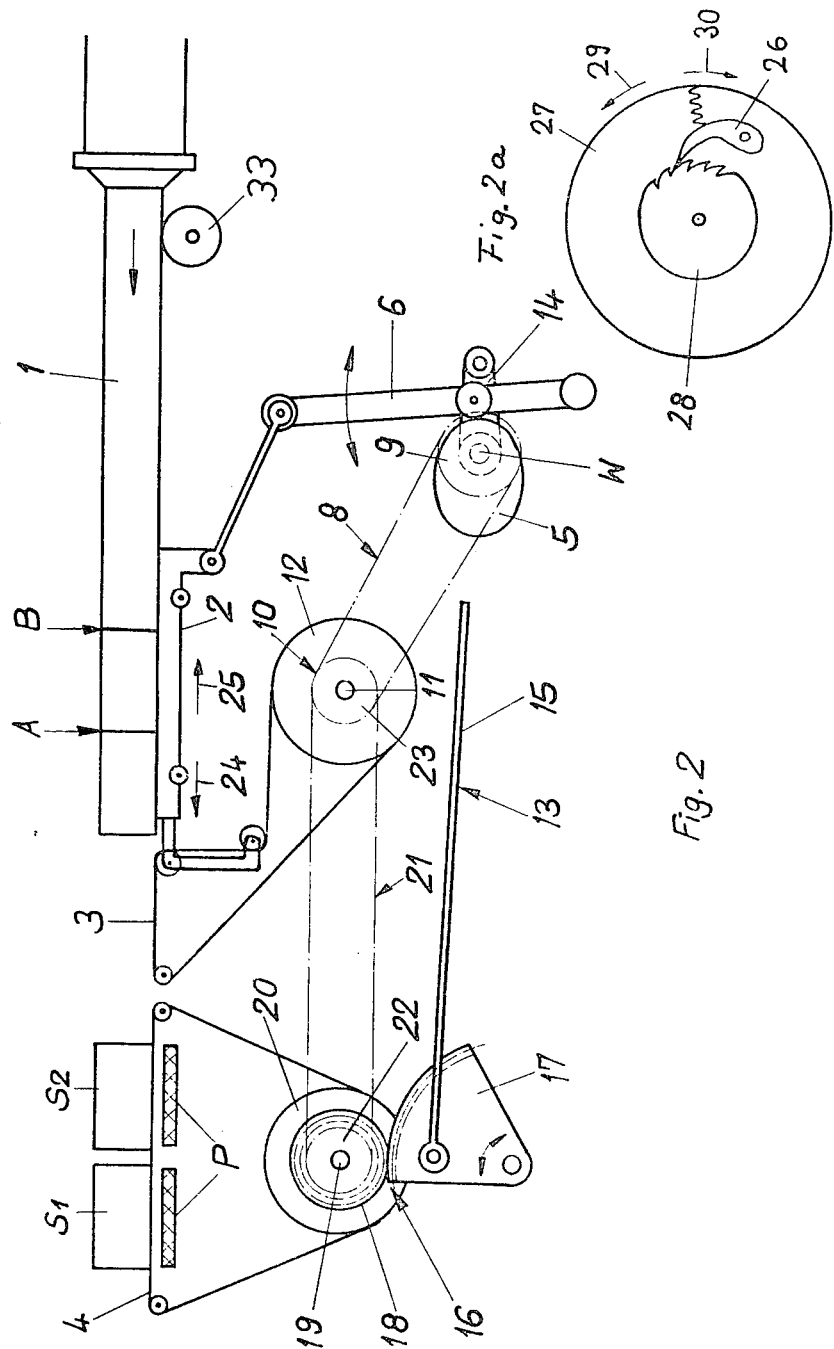
FIG. 2 is a side elevational view of FIG. 1 in another operating position.
Figure 3:
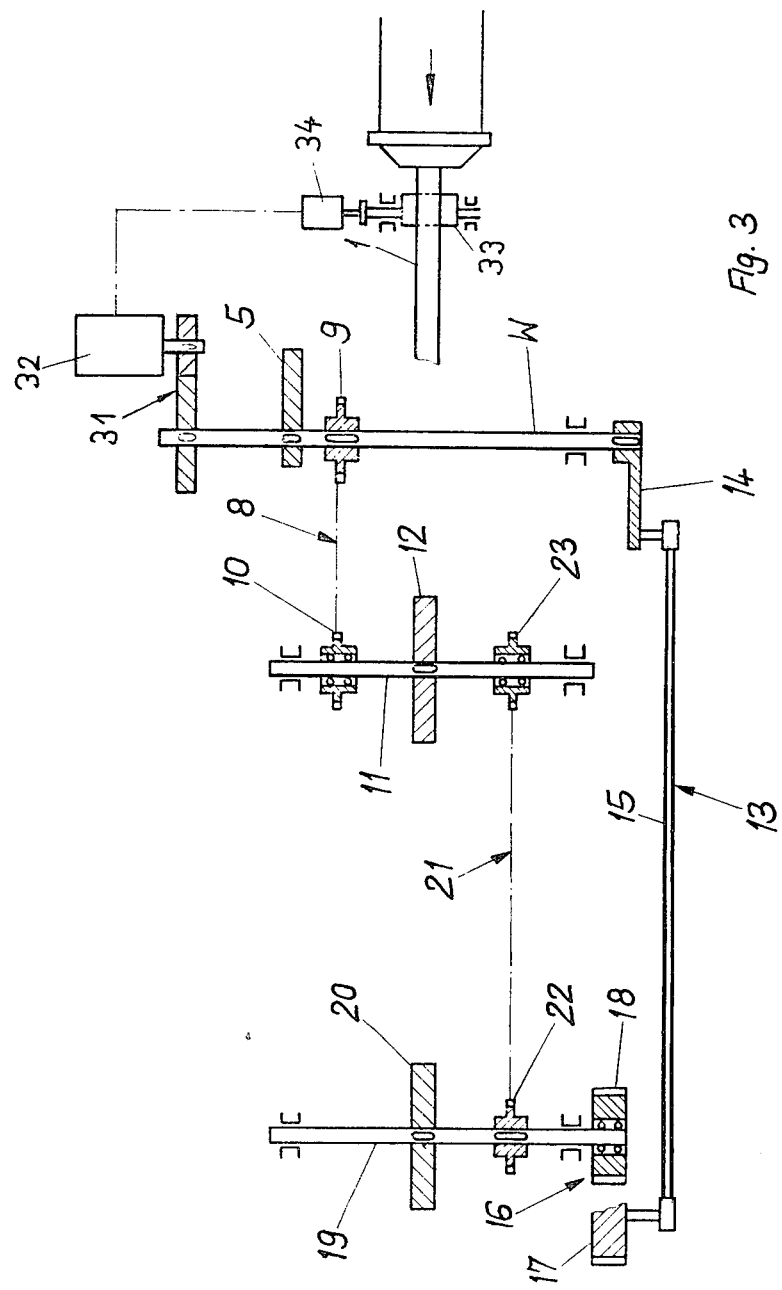
FIG. 3 is a top plan view of the apparatus with the cutting carriage and the conveyor belts left out to facilitate clarity of illustration.

When the shaft W and the cam plate 5 move in the direction of the arrow 7, the crank 14 moves from the position shown in FIG. 1 to the position shown in FIG. 2 and drives the conveyor belt 4 by means of the crank drive 13 and the gear transmission 16. The conveyor belt 3 is driven by the chain drive 21 also with the same sinusoidally increasing speed as the conveyor 4, thereby surpassing the speed of the steady drive of the conveyor belt 3 by the chain drive 8. That is possible because of the chain wheel 10 which is mounted on the shaft by a coasting device as previously explained.

Due to the aforedescribed movement of the cam plate 5 and the crank 14, the cutting carriage 2 moves forward in the direction of the arrow 24 and simultaneously carries along the conveyor belt 3 which has part of its roller mounting support operatively connected to the cutting carriage. Thus the supporting means for supporting the two vertically aligned conveyor support rollers of conveyor belt 3 as shown in FIG. 1 are operatively connected to the carriage 2 by the connecting means shown in FIG. 1 so that such vertically aligned conveyor support rollers are moved back and forth between the FIG. 1 and FIG. 2 positions. Due to the drive connection between the conveyor belt 3 and the conveyor belt 4 by means of the chain drive 21, the conveyor belt 3 takes on the same speed at which the conveyor belt 4 moves. This causes the transport of the split-brick sections S1 and S2, sitting upon the conveyor belt 3, to pass onto the conveyor belt 4. The split-brick sections S1 and S2 are transferred without friction because the conveyor belts 3 and 4 move at the same speed during this advancing process. The sinusoidal movement of the crank results in a smooth starting and an exact stopping when the split-brick sections reach the pallets P (FIG. 2). During this process the cut-off, split-brick sections S1 and S2 do not move relative to the cutting carriage 2 because the ribbon 1 and the cutting carriage 2 move synchronously at the same speed.

While the work cycle progresses the cam plate 5 and the crank 14 move out of the position shown in FIG. 2, while the conveyor belt 4 remains standing still due to the coasting of the gear 18 on the shaft 19 so that the split-brick sections S1 and S2 may be removed from the conveyor belt 4 and positioned upon the pallets P disposed underneath the conveyor belt 4 at a right angle.

Simultaneously, the cam plate 5 moves the cutting carriage 2 backwards in the direction of the arrow 25 by means of the lever bar 6 while the ribbon 1 moves steadily forwards in the direction of the arrow 24 and pushes the cut split-brick sections S1 and S2 from the cutting carriage 2 on to the conveyor belt 3.

Here again, the conveyor belt 3 is driven by the chain drive 8 actuated by the constantly running drive mechanism driving shaft 11 and has the same speed as the ribbon 1 because the conveyor belt 4 stands still and is prevented by the coasting of the chain wheel 23 to influence the speed of the conveyor belt 3 in this part of the cycle. The move of the split-brick sections S1 and S2 from the cutting carriage 2 on to the conveyor belt 3 occurs without friction because the conveyor belt 3 moves at the speed of the ribbon.

After the aforedescribed process a new cycle begins wherein the cutting carriage 4 again moves forward in the direction of the arrow 24 while the carrying run of the conveyor belt 3 becomes shorter corresponding to the length of the movement of the cutting carriage 2 and assumes another increased speed corresponding to the conveyor belt 4, whereby conveyor belts 3 and 4 run synchronously during the delivery of the split-brick sections S1 and S2 from the conveyor belt 3 to conveyor belt 4.

The coasting devices 10, 18, 23 interconnect two rotational parts while permitting one of the parts to rotate faster than the other and to permit one part to be driven in one direction and to be rotationally free in the other direction. FIG. 2a shows a coasting device wherein two rotational parts, that is a pinion 28 and wheel 27 are provided and a ratchet 26 pivotably mounted on wheel 27 is adapted to engage ratchet teeth on the pinion 28. When the wheel 27 is driven in the direction of arrow 29, the pinion 28 is driven by the ratchet 26, but the pinion 28 may be driven faster than the wheel 27 in a counter-clockwise direction as shown in FIG. 2a. When the wheel 27 rotates in the direction of arrow 30, the wheel 27 does not drive the pinion 28.

It is thought that the invention and many of its attendant advantages will be understood from the foregoing description and that it will be apparent that various changes may be made in the form, construction, and arrangements of the parts without departing from the spirit and scope of the invention or sacrificing all of its material advantages. The form heretofore described being merely a preferred embodiment thereof.

What is claimed is:

1. Apparatus for transporting brick elements cut from a continuous advancing ribbon of brick-forming material comprising a cutting carriage for receiving said continuous advancing ribbon, means for reciprocating said carriage in advance and return directions, said cutting carriage moving in said advance direction at the same speed as the advancing ribbon, cutting means for cutting brick elements from the leading end portion of said advancing ribbon on said cutting carriage, first conveyor means for receiving said cut brick elements from said cutting carriage, second conveyor means for receiving the cut brick elements from said first conveyor means, connecting means for operably connecting said cutting carriage and said first conveyor means such that the support run of the first conveyor means is alternately shortened and lengthened with the respective advancement and return of said cutting carriage, and drive means for driving said first and second conveyor means at the same speeds while said cutting carriage advances, said drive means also being adapted to drive said first conveyor means at the same speed as the speed of advancement of said ribbon while said cutting carriage moves in said return direction, said second conveyor means being stationary while said cutting carriage moves in said return direction.

2. Apparatus according to claim 1 wherein said first and second conveyor means are adapted to advance at a speed higher than the speed of advancement of said ribbon.

3. Apparatus according to claim 2 wherein said first and second conveyors are adapted to advance with a sinusoidally raising speed.

4. Apparatus according to claim 1 wherein said drive means comprises a first shaft, a second shaft on which a first conveyor pulley is mounted, said first conveyor means comprising a first endless conveyor belt driven by said first conveyor pulley, and first interconnecting means between said first and second shafts such that said first shaft drives said first conveyor belt at the same speed as the speed of the advancing ribbon while said cutting carriage moves in said return direction.

5. Apparatus according to claim 4 wherein said drive means further comprises a rotary cam mounted on said first shaft, and linkage means between said rotary cam and said cutting carriage such that the latter is reciprocated by said rotary cam.

6. Apparatus according to claim 4 wherein said drive means further comprises a third shaft on which a second conveyor pulley is mounted, said second conveyor means comprising a second endless conveyor belt driven by said second conveyor pulley, and second interconnecting means between said first shaft and said third shaft adapted to drive said second conveyor belt while said cutting carriage moves it in its advance direction.

7. Apparatus according to claim 4 further comprising third interconnecting means between said third and second shafts for driving said first conveyor belt at the same speed as said second conveyor belt while the cutting carriage moves in said advancing direction.

8. Apparatus according to claim 4 wherein said second interconnecting means comprises a crank arm driven by said first shaft, a gear disposed on said third shaft, a gear element pivotal about an axis spaced from the axis of said third shaft, said gear element meshing with said gear, and linkage means between said crank arm and said gear element for rocking said gear element back and forth and for driving said third shaft when the gear element rocks in one direction.

9. Apparatus according to claim 8 further comprising a coasting means mounting said gear on said third shaft such that said third shaft remains stationary when the gear element rocks in the opposite direction.

10. Apparatus according to claim 7 wherein said third interconnecting means comprises a gear element fixedly mounted on said third shaft, a coasting means mounted on said second shaft, and an endless chain which passes over said gear element and said coasting means so that said third shaft drives said second shaft at a faster speed than said second shaft is driven by said first shaft during the advancing movement of said cutting carriage.

11. Apparatus according to claim 7 wherein said first interconnecting means comprises a gear element fixedly mounted on said first shaft, a coasting means mounted on said second shaft, and an endless chain passing over the last said gear element and the last said coasting means so that said first shaft drives said second shaft at the same speed as said advancing ribbon during the return movement of said cutting carriage while permitting said third shaft to drive said second shaft through said third interconnecting means at a speed faster than the speed of the advancement movement of said cutting carriage.

12. Apparatus according to claim 9 wherein said first conveyor means comprises a support roller for a conveyor belt, said connecting means connecting said support roller to said cutting carriage to reciprocate said support roller with said cutting carriage.

* * * * *